(12) United States Patent
Chang et al.

(10) Patent No.: US 9,148,916 B2
(45) Date of Patent: Sep. 29, 2015

(54) LED LINEAR REGULATOR CIRCUIT WITH IMPROVED POWER FACTOR

(71) Applicant: TSMC Solid State Lighting Ltd., Hsin-Chu (TW)

(72) Inventors: Ming-Shun Chang, Taipei (TW); Ko-Chih Chiu, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 281 days.

(21) Appl. No.: 13/800,958

(22) Filed: Mar. 13, 2013

(65) Prior Publication Data

US 2014/0265892 A1 Sep. 18, 2014

Related U.S. Application Data

(60) Provisional application No. 61/778,043, filed on Mar. 12, 2013.

(51) Int. Cl.
*H05B 33/08* (2006.01)

(52) U.S. Cl.
CPC ........... *H05B 33/0812* (2013.01); *Y02B 20/345* (2013.01)

(58) Field of Classification Search
USPC ............. 315/185 R, 187, 224, 247, 291, 294, 315/307, 308
See application file for complete search history.

(56) References Cited

U.S. PATENT DOCUMENTS

| 2010/0045206 A1* | 2/2010 | Chuang | 315/294 |
| 2011/0291564 A1* | 12/2011 | Huang | 315/77 |
| 2012/0146549 A1* | 6/2012 | Radermacher | 315/307 |
| 2013/0026923 A1* | 1/2013 | Athalye et al. | 315/113 |
| 2013/0049618 A1* | 2/2013 | Radermacher | 315/200 R |
| 2013/0069547 A1* | 3/2013 | van de Ven et al. | 315/188 |

* cited by examiner

*Primary Examiner* — Douglas W Owens
*Assistant Examiner* — Thai Pham
(74) *Attorney, Agent, or Firm* — Muncy, Geissler, Olds & Lowe, P.C.

(57) ABSTRACT

The present disclosure involves a device. The device includes a rectifier coupled to receive energy from an alternating current (AC) voltage source. A capacitor is coupled to the rectifier. A plurality of LEDs and a current limiter are coupled in series. The current limiter is configured to limit a current through the LEDs. The plurality of LEDs and the current limiter are collectively coupled to the capacitor in parallel. A current controller is coupled to both the capacitor and the current limiter in series. The current controller is configured to control at least a charging current of the capacitor. The device has a first current path during a first period of operation and a second current path during a second period of operation. The capacitor charges during the first period of operation and discharges during the second period of operation.

20 Claims, 9 Drawing Sheets

LED LINEAR REGULATOR CIRCUIT WITH IMPROVED POWER FACTOR

PRIORITY DATA

This application is a Utility patent application of provisional U.S. Patent Application No. 61/778,043, filed on Mar. 13, 2013, entitled "LED LINEAR REGULATOR CIRCUIT WITH IMPROVED POWER FACTOR," the disclosure of which is incorporated herein by reference in its entirety.

TECHNICAL FIELD

The present disclosure relates generally to light-emitting devices, and more particularly, to a light-emitting diode (LED) linear regular circuit with improved power factor.

BACKGROUND

An LED device or an LED, as used herein, is a semiconductor light source for generating a light at a specified wavelength or a range of wavelengths. LEDs have increasingly gained popularity due to favorable characteristics such as small device size, long lifetime, efficient energy consumption, and good durability and reliability. In recent years, LEDs have been deployed in various applications, including indicators, light sensors, traffic lights, broadband data transmission, and illumination devices. LEDs emit light when a voltage is applied.

LED linear regulators may be used to perform various LED driving methodologies. The LED linear regulator may contain a plurality of LEDs that may be driven by an alternating current (AC) source. However, traditional LED linear regulators typically have drawbacks relating to insufficient total light output, flicker noise, and/or low power factor. These drawbacks lead to inefficiencies and degraded performance of the traditional LED linear regulators.

Therefore, while existing LED linear regulators have been generally adequate for their intended purposes, they have not been entirely satisfactory in every aspect. An improved LED linear regulator with improved power factor and increased total light output continues to be sought.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is understood that the following disclosure provides many different embodiments, or examples, for implementing different features of various embodiments. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Moreover, the terms "top," "bottom," "under," "over," and the like are used for convenience and are not meant to limit the scope of embodiments to any particular orientation. Various features may also be arbitrarily drawn in different scales for the sake of simplicity and clarity. In addition, the present disclosure may repeat reference numerals and/or letters in the various examples. This repetition is for the purpose of simplicity and clarity and does not in itself necessarily dictate a relationship between the various embodiments and/or configurations discussed.

When turned on, light-emitting diode (LED) devices may emit radiation such as different colors of light in a visible spectrum, as well as radiation with ultraviolet or infrared wavelengths. Compared to traditional light sources (e.g., incandescent light bulbs), LEDs offer advantages such as smaller size, lower energy consumption, longer lifetime, variety of available colors, and greater durability and reliability. These advantages, as well as advancements in LED fabrication technologies that have made LEDs cheaper and more robust, have added to the growing popularity of LEDs in recent years.

Nevertheless, existing LED lighting applications may still have certain shortcomings. For example, an LED linear regulator (one type of LED lighting application) may include a plurality of LEDs electrically coupled together in series. These LEDs are driven by an AC power source to generate a light output. However, traditional LED linear regulators either suffer from insufficient light output and excessive flicker noise, or reduced power factor, which leads to inefficiencies.

According to various aspects of the present disclosure, described below is a LED linear regulator that substantially overcomes these issues discussed above. FIGS. 1-7 include circuit schematics and various voltage and current waveforms of the LED linear regulator according to some embodiments. These figures have been simplified for a better understanding of the inventive concepts of the present disclosure.

Figure 1:
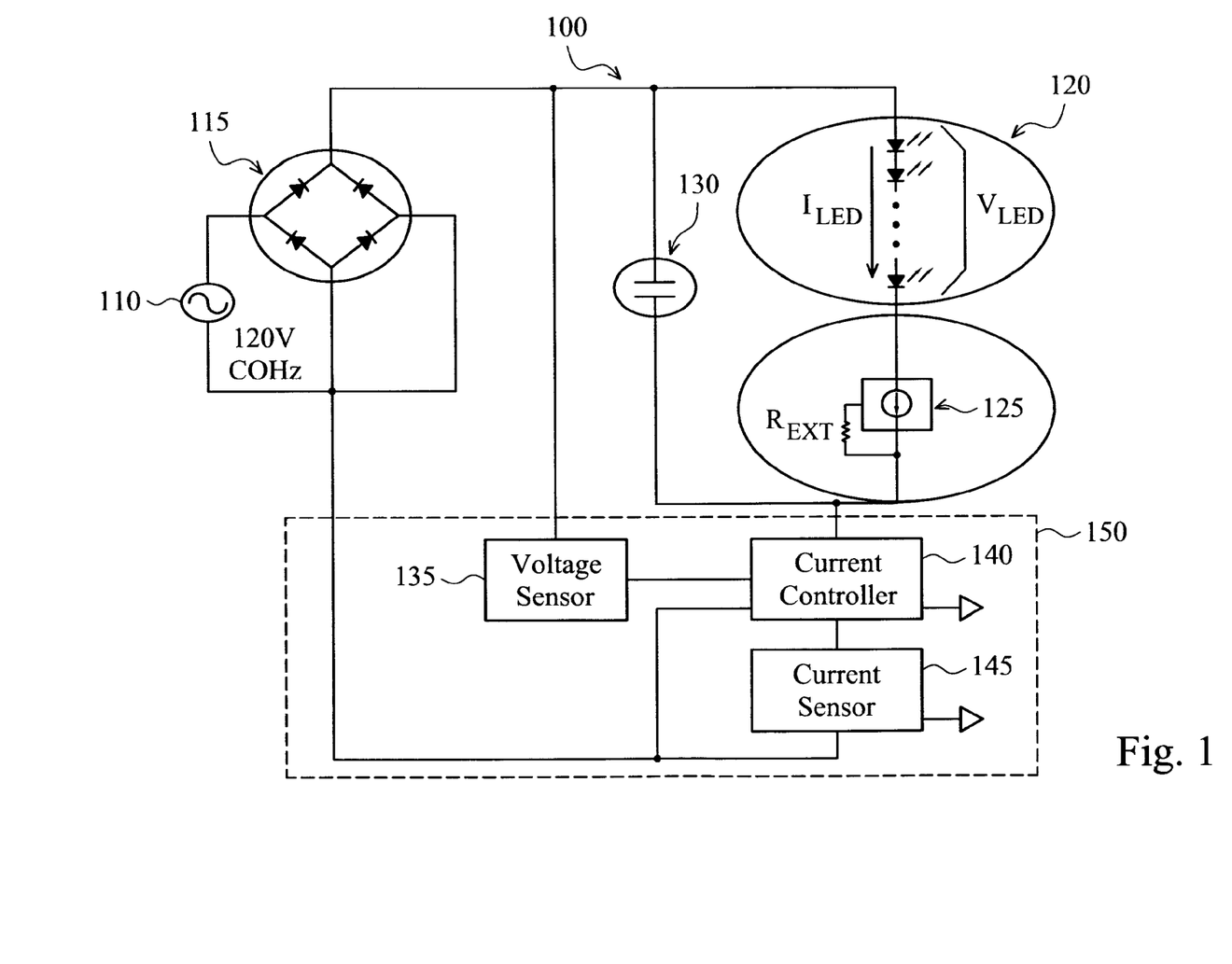
FIGS. 1-3 are circuit schematics of an LED linear regulator according to some embodiments of the present disclosure.

Referring to FIG. 1, a circuit schematic of an LED linear regulator 100 is illustrated. The LED linear regulator 100 is driven by an energy source (or energy supply), for example an AC voltage source 110. In some embodiments, the AC voltage source 110 provides a 120-volt AC voltage at 60 hertz (Hz). In other embodiments, the AC voltage source 110 may provide a different AC voltage at the same or different frequency. For example, a 120-volt AC voltage may be provided at other embodiments. It is understood that other suitable energy sources may be used in alternative embodiments as well.

The LED linear regulator 100 includes a rectifier, for example a bridge diode component 115. The bridge diode component 115 is electrically coupled to the AC voltage source 110. The bridge diode component 115 is configured to convert the AC sinusoidal voltage output from the AC voltage source 110 into an "M-shaped" voltage. In other words, the bridge diode component 115 (or other embodiments of rectifiers) is configured to convert an AC output to a direct current (DC) output. In alternative embodiments, other suitable types of rectifiers may be implemented in place of, or in addition to, the bridge diode component 115 in order to convert the AC output of the AC voltage source 110 to a desired DC output.

The LED linear regulator 100 includes a plurality of LEDs (also referred to as an LED string) 120. These LEDs 120 are electrically coupled together in matrix (in parallel and in series). The LEDs 120 are also electrically coupled to the bridge diode component 115. The LEDs 120 may serve as the output load of the LED linear regulator 100 and generates light when powered on.

The LED linear regulator 100 includes a current limiter 125. The current limiter 125 is configured to limit an amount of current through the LEDs 120, so as to protect the LEDs 120 from damage. In some embodiments, the current limiter 125 is implemented as one or more discrete circuit elements. In other embodiments, the current limiter 125 is integrated into an Integrated Circuit (IC) chip.

The LED linear regulator 100 includes an energy storage element. In the illustrated embodiments, the energy storage element includes a capacitor 130, such as an electrolytic capacitor 130. In other embodiments, different types of capacitor or other suitable energy storage means may be employed as the energy storage element. The capacitor 130 is electrically coupled to the LEDs 120 and the current limiter 125 in parallel. The capacitor 130 may also be referred to as an input capacitor. Energy storage elements such as the capacitor 130 can charge and discharge during different operation periods. Due to the charging/discharging characteristics of the capacitor 130, it is used to increase the total light output herein, as discussed below in more detail.

The LED linear regulator 100 includes a voltage sensor 135. The voltage sensor 135 is configured to sense an output voltage of the bridge diode 115 (or an input voltage of the LED linear regulator 100). The voltage sensor 135 can be configured to make the input current more sinusoidal. In some embodiments, the voltage sensor 135 may be omitted to reduce circuit complexity and to lower cost.

The LED linear regulator 100 includes a current controller 140 electrically coupled between the voltage sensor 135 and the capacitor 130. In various embodiments, the current controller 140 may include, but is not limited to, one or more of the following microelectronic circuit elements: comparators, feedback circuitry, power input circuitry, driving circuitry, and output circuitry. The current controller 140, voltage sensor 135, current sensor 145, and current limiter 125 could all be integrated into an Integrated Circuit chip, such as an Application Specific Integrated Circuit (ASIC) chip.

In one aspect, the current controller 140 protects the linear regulator 100 by limiting an overall amount of current going through the linear regulator 100. This includes the current through the capacitor 130 as well as current through the LEDs 120 (which is also limited by the current limiter 125). However, it is understood that in a discharge cycle of the linear regulator 100 (discussed below in more detail with reference to FIG. 3), the current controller 140 may not be active, and the current limiter 125 is protecting the LEDs 120 by limiting the current through the LEDs 120.

In another aspect, the current controller 140 is configured to force the input current waveform to substantially follow (i.e., be phase-aligned with) the input voltage waveform. In more detail, in conventional linear regulators without the capacitor 130, the load is mostly resistive, and therefore the current and voltage are aligned. This leads to a good power factor, which may be defined as a ratio of: (a real power flowing through the load) to (an apparent power in the circuit). The real power cannot exceed the apparent power in the circuit, and thus, the power factor is a dimensionless number that fluctuates from 0 to 1. In general, power factor of a circuit measures an efficiency of the circuit. However, for conventional linear regulators without the capacitor 130, the LEDs are only driven when the input voltage is higher than a total forward voltage of the LEDs. Thus the effective lighting time (when LEDs are turned on) is reduced. The impact is that the LEDs have a lower total light output and suffers from flicker noise issues (i.e., undesired periodic dimming of the light output).

Here, the presence of the capacitor 130 serves as a capacitive load for the LED linear regulator 100 (for the driving AC source 110). The capacitor 130 charges up during the charging cycle (discussed below in more detail with reference to FIG. 2) of the LED linear regulator 100, and provides an energy source for the LEDs 120 during the discharging cycle of the LED linear regulator 100. Therefore, the light output performance for the LEDs is greatly improved, and the LED flicker noise issues are substantially minimized. However, according to circuit theory, a capacitive load (or an inductive load, for that matter) will cause the phase of the current to be misaligned with the phase of the voltage (whereas a resistive load will cause the phase of the current to be aligned with the phase of the voltage). The phase misalignment of the current and voltage leads to a reduced power factor, thereby lowering the efficiency of the circuit.

Here, according to the various aspects of the present disclosure, the current controller 140 makes the overall load behave more like a resistive load by its own resistance and also by limiting the capacitor charging current. Therefore, the phases of the input current and the input voltage are more closely aligned, thereby increasing the power factor of the circuit and making the circuit more efficient.

The LED linear regulator 100 includes a current sensor 145 that is electrically coupled to the current controller 140. The current sensor 145 may include a resistor in some embodiments. The current sensor 145 is configured to sense the amount of current flowing through the current controller 140. The current sensor 145 senses the current value and provides feedback to the current controller 140. It is understood that the current controller 140 and the current sensor 145 may each include a plurality of pins (for electrical connectivity) that are not necessarily illustrated herein. Some of these pins are connected to ground, while other pins may be connected to other circuit elements.

As discussed above, the current limiter 125, the voltage sensor 135, the current controller 140, and the current sensor 145 may each be implemented as discrete elements or may be integrated onto an IC chip in various embodiments. In certain embodiments, one or more of the voltage sensor 135, the current controller 140, and the current sensor 145 may be integrated together in an Application Specific Integrated Circuit (ASIC) chip, for example an ASIC chip 150 that is delineated by the dashed outlines shown in FIG. 1. This ASIC chip 150 could integrate the current limited 125 if necessary.

Figure 2:
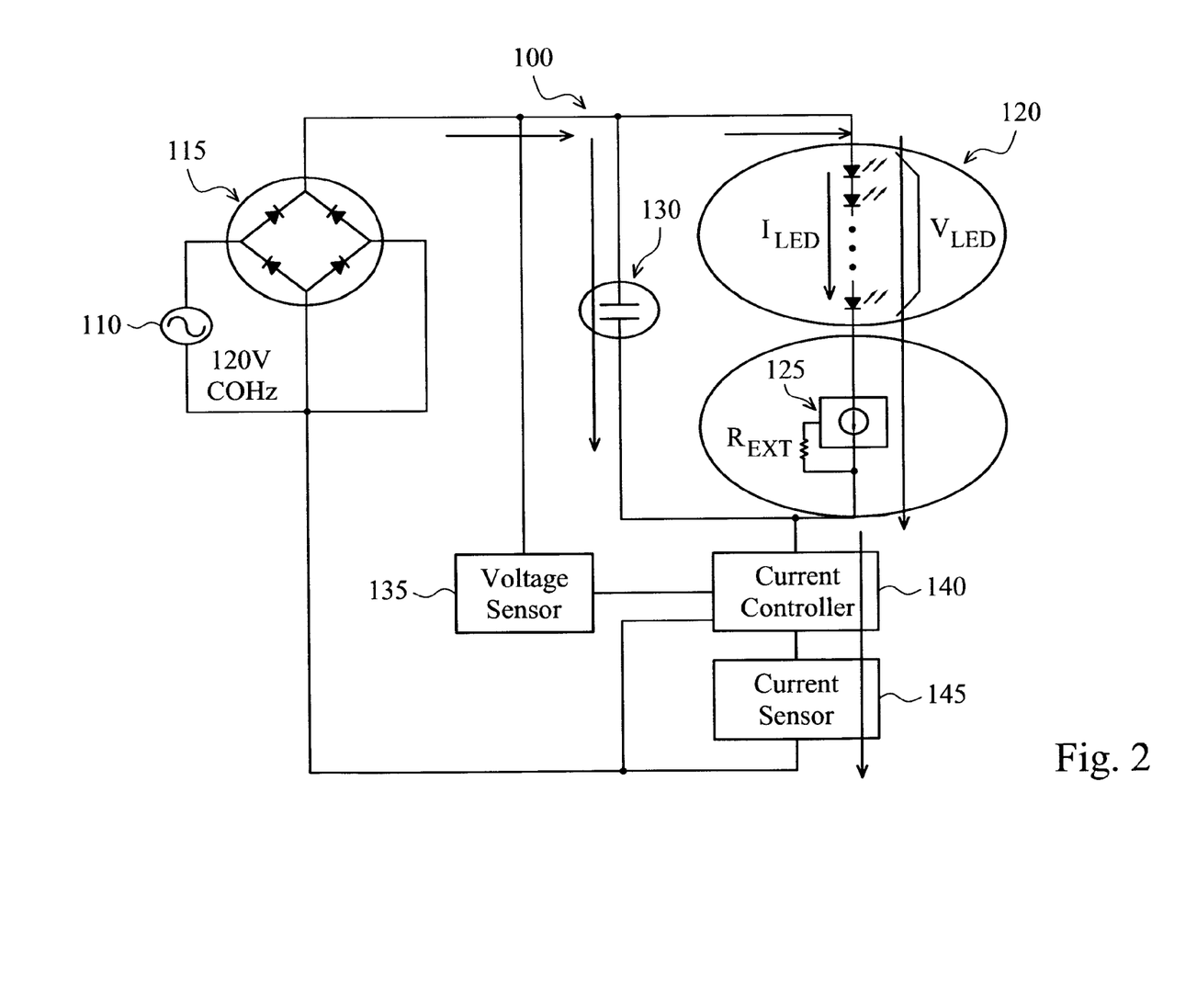

Also as discussed above, the LED linear regulator 100 has two different current paths corresponding to two different time periods. During a first time period (hereinafter referred to as T1), the input voltage is greater than the voltage of the capacitor 130. Therefore, the capacitor 130 charges during this T1 time. The electrical current path during this T1 period is illustrated in FIG. 2 (i.e., the arrows).

Figure 3:
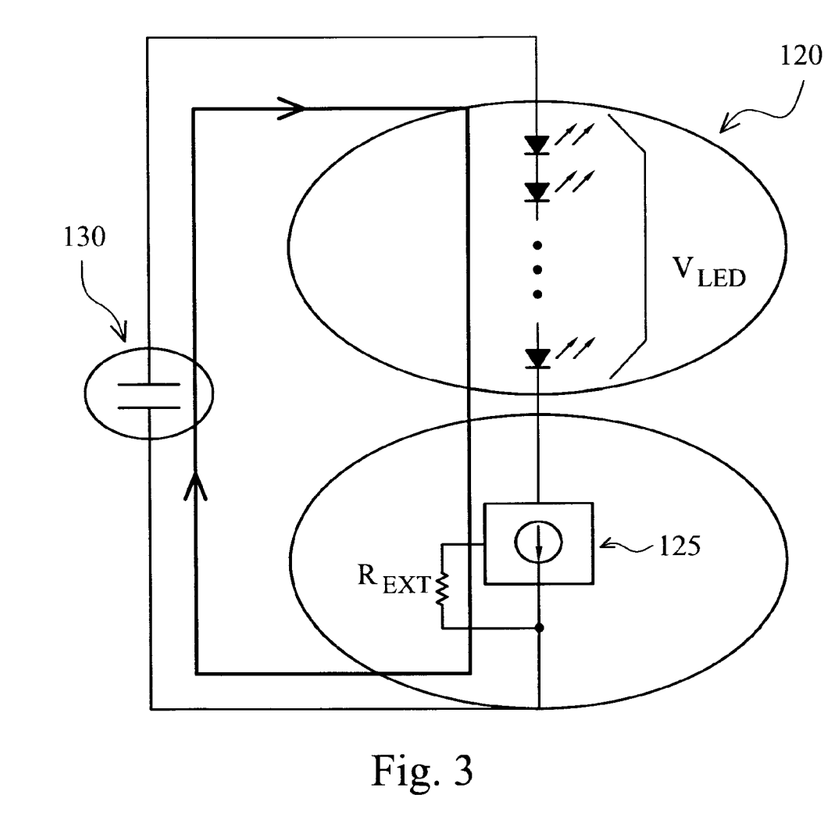

During a second time period (hereinafter referred to as T2), the input voltage is lower than the voltage of the capacitor 130. Therefore, the capacitor 130 discharges during this T2 time. Input current stops. The current through the LEDs 120 is now supplied by the discharging capacitor 130. The electrical current path during this T2 period is illustrated in FIG. 3 (i.e., the loop, which is a partial circuit of the LED linear regulator 100). It is understood that T1 and T2 correspond to steady state operations and repeat in an alternating manner.

Figure 4:
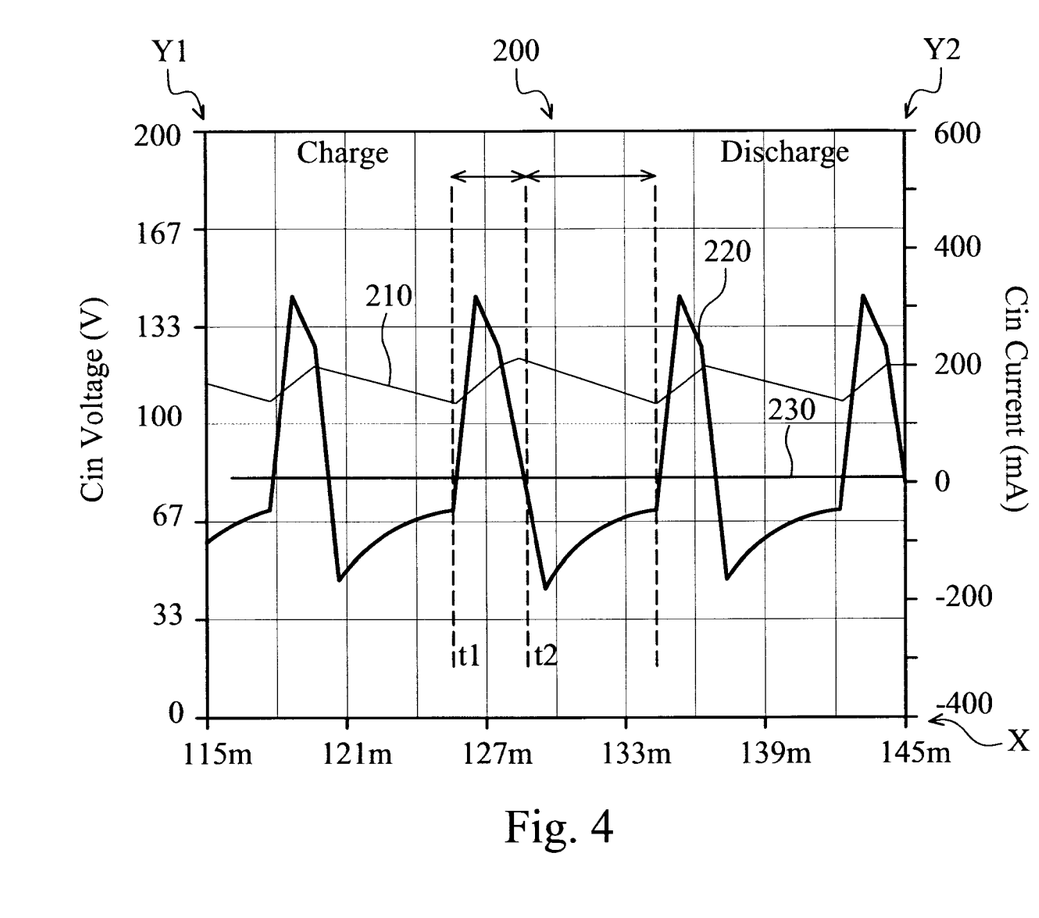
FIG. 4 is a plot of sample current and voltage waveforms of a capacitor in the LED linear regulator according to some embodiments of the present disclosure.

FIG. 4 illustrates the current and voltage waveforms of the capacitor 130 as it undergoes the T1 (charge) and T2 (discharge) time periods discussed above. In more detail, FIG. 4 is a graph 200 that includes an X-axis, and two Y-axes (Y1 and Y2) superimposed together. In the embodiment illustrated, the X-axis represents time, the Y1-axis represents the capacitor voltage, and the Y2-axis represents the capacitor current. The graph 200 includes a voltage waveform 210 as a plot of the Y1-axis versus the X-axis. The voltage waveform 210 represents a variation of the voltage of the capacitor 130 with respect to time. The graph 200 also includes a current waveform 220 as a plot of the Y2-axis versus the X-axis. The current waveform 220 represents a variation of the current of the capacitor 130 with respect to time.

The voltage waveform 210 and the current waveform 220 each include a plurality of cycles. Each cycle is made up of a T1 period and a T2 period. As is shown in FIG. 4, during the T1 period, the current through the capacitor 130 is greater than zero (indicated by the current waveform 220 being above a zero current line 230). Thus, the capacitor 130 is charging during the T1 period. During the T2 period, the current through the capacitor 130 is less than zero (indicated by the current waveform 220 being below the zero current line 230), meaning the current is flowing reversely. Thus, the capacitor 130 is discharging during the T2 period.

Figure 5:
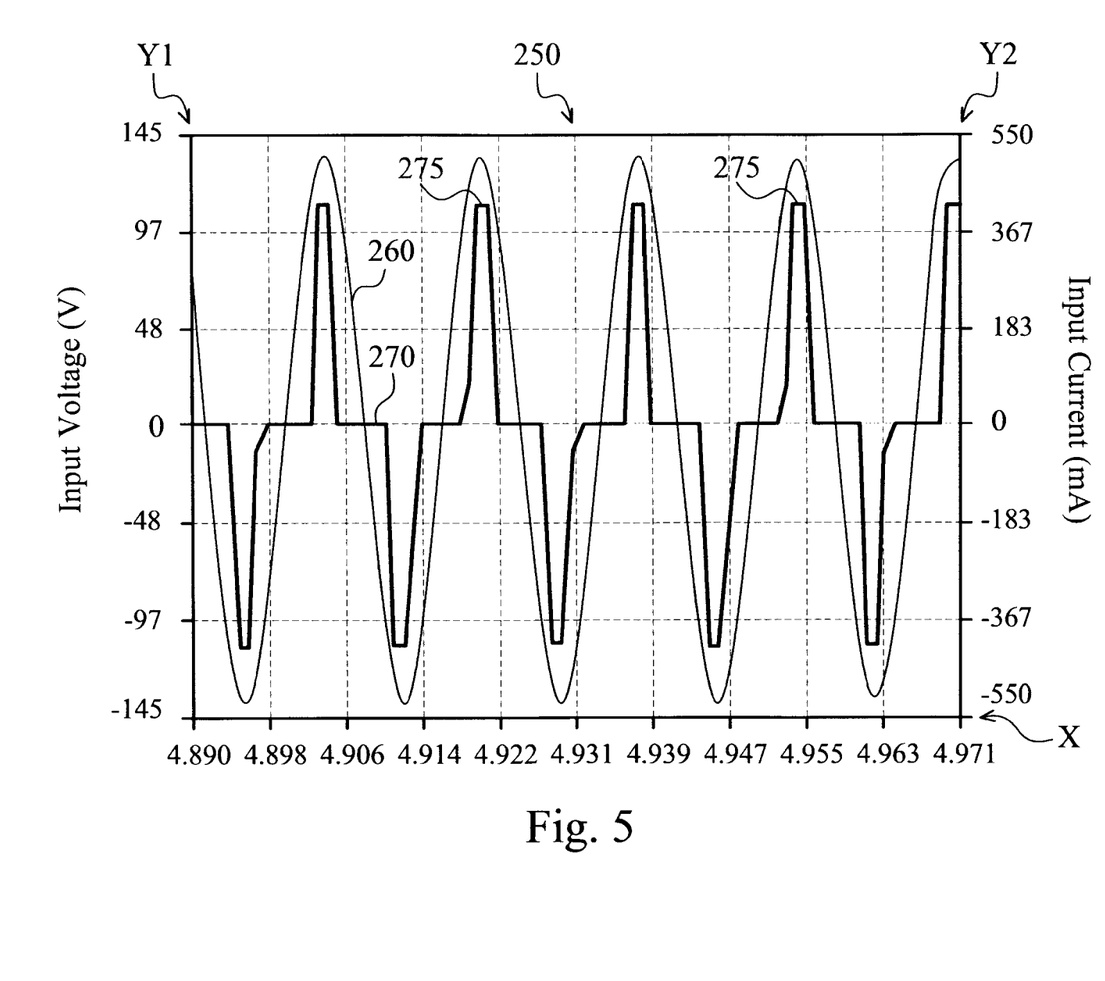
FIG. 5 is a plot of sample input current and input voltage waveforms of the LED linear regulator according to some embodiments of the present disclosure.

FIG. 5 illustrates the input current waveform and the input voltage waveform for the LED linear regulator 100. In more detail, FIG. 5 is a graph 250 that includes an X-axis, and two Y-axes (Y1 and Y2) superimposed together. In the embodiment illustrated, the X-axis represents time, the Y1-axis represents the input voltage, and the Y2-axis represents the input current. The graph 250 includes a voltage waveform 260 as a plot of the Y1-axis versus the X-axis. In other words, the voltage waveform 260 represents a variation of the input voltage with respect to time. The graph 250 also includes a current waveform 270 as a plot of the Y2-axis versus the X-axis. In other words, the current waveform 270 represents a variation of the input current with respect to time. Note that the input current waveform 270 has peaks (e.g., peaks 275) that are set by the current controller 140 of FIG. 1.

Figure 6:
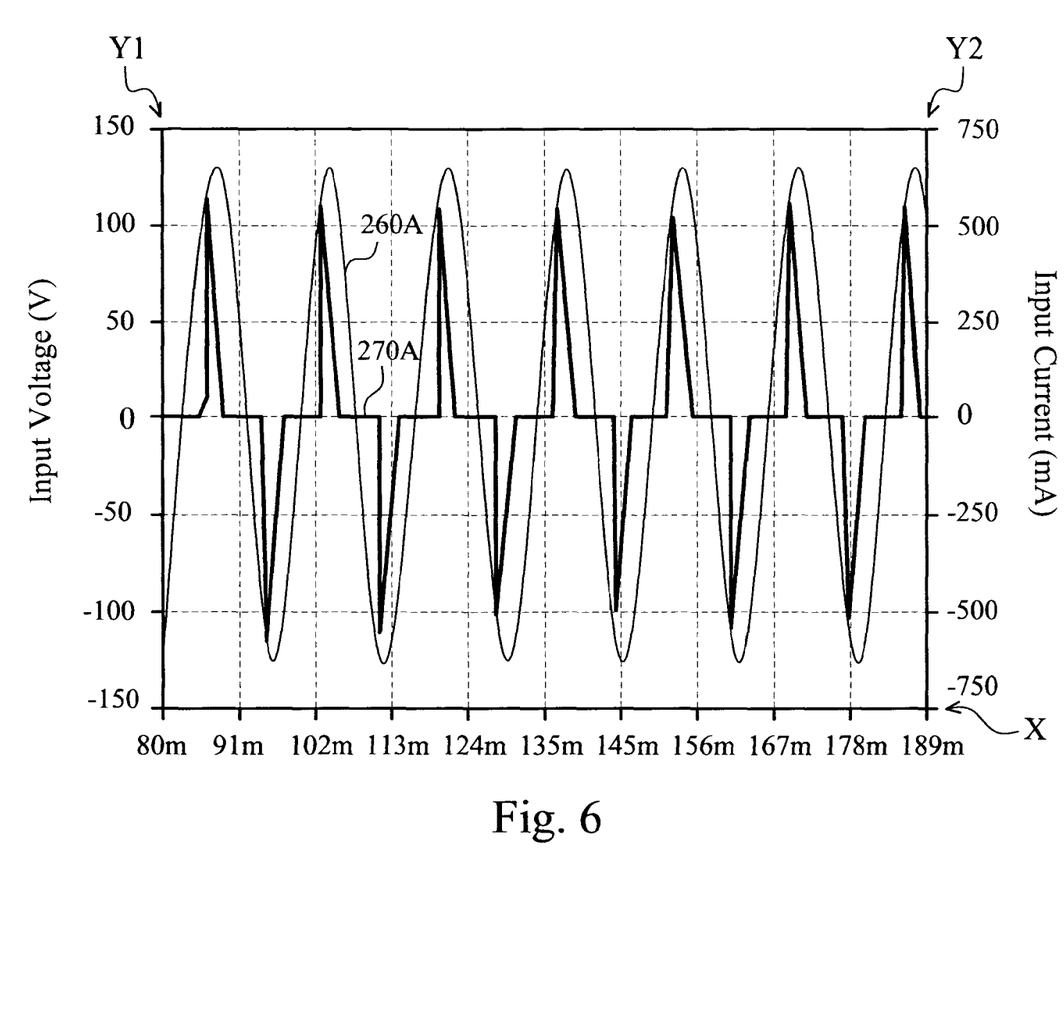
FIG. 6 is a plot of sample input current and input voltage waveforms of an LED linear regulator having a capacitive load.

If only the capacitor 130 is coupled to the bridge diode component 115, the load will be quite capacitive, which will lead to a phase misalignment between the input voltage and input current. This is shown in FIG. 6, where waveforms 260A and 270A represent the input voltage and input current for an LED linear regulator having a capacitive load, respectively. As can be seen in FIG. 6, there is a substantial phase misalignment between the input voltage and input current (as indicated by the horizontal shift between the waveforms 260A and 270A). As discussed above, such phase misalignment due to a capacitor-dominated load is undesirable, as it drags down power factor.

However, the presence of the current controller 140 makes the overall load more resistive and less capacitive. A resistive load means that the phases of the input voltage and the input current will align with each other, as shown in FIG. 5. Therefore, the current controller 140 implemented herein substantially reduces the phase misalignment between the input voltage and the input current. This improves the power factor of the LED linear regulator and increases its efficiency.

Figure 7:
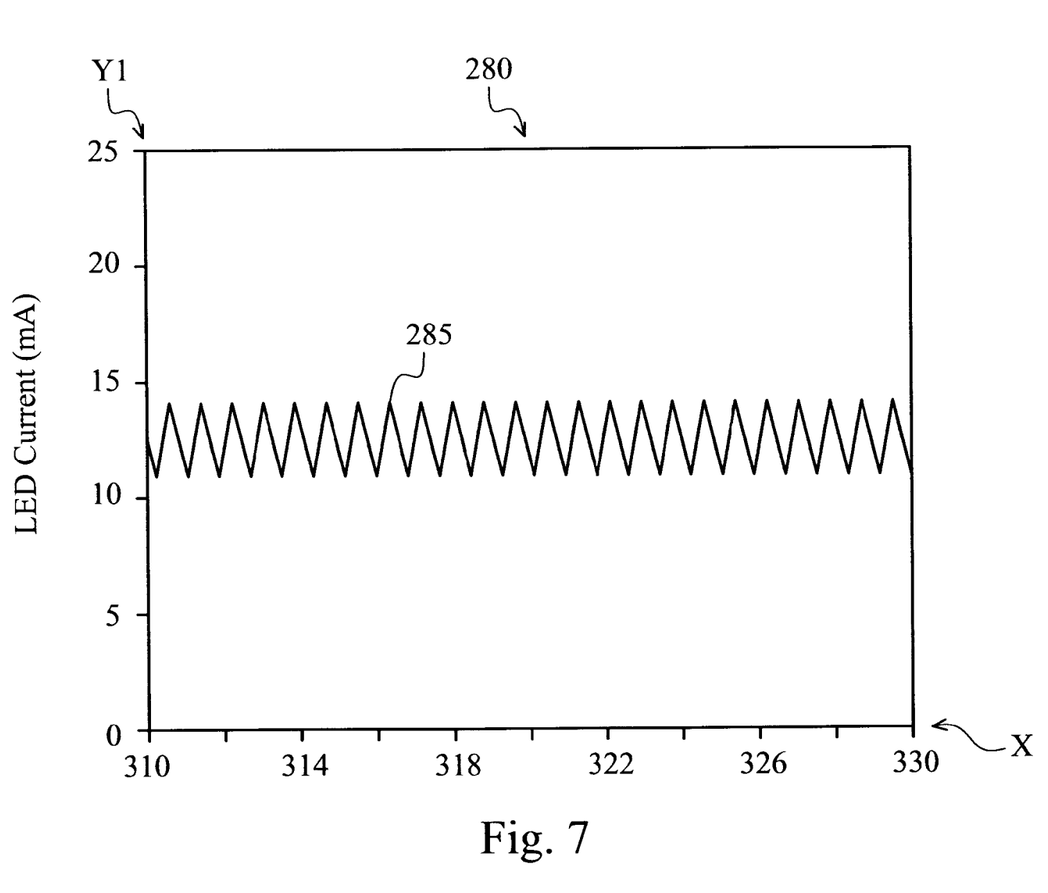
FIG. 7 is a plot of LED current waveforms for the LED linear regulator according to some embodiments of the present disclosure.

FIG. 7 illustrates a current waveform of the LEDs 120 of FIG. 1. In more detail, FIG. 7 is a graph 280 that includes an X-axis and a Y-axis. In the embodiment illustrated, the X-axis represents time, and the Y-axis represents the current through the LEDs 120. Thus, the graph 280 has an LED current waveform 285 as a plot of the Y-axis versus the X-axis. As can be seen from FIG. 7, the LED current herein always has a non-zero value (i.e., the waveform 285 never dips below the 0 line). This is at least in part due to the fact that the AC voltage source 110 (FIG. 1) provides the current for the LEDs 120 as the capacitor 130 is charging, and the capacitor 130 provides the current for the LEDs 120 as the capacitor 130 is discharging. Therefore, the LEDs 120 always have at least some amount of non-zero current, as long as the LED linear regulator 100 is turned on. As such, the LED linear regulator 100 has sufficient light output throughout its operation, and flicker noise issues can be substantially eliminated.

It is understood that the various current and voltage waveforms shown in FIGS. 4-7 are merely examples to help illustrate certain concepts of the present disclosure. In various other embodiments, the shapes, sizes, and/or phases of these current and voltage waveforms may vary without departing from the spirit and the scope of the present disclosure.

The LED linear regulator discussed according to the embodiments disclosed herein offer advantages over existing LED linear regulators. It is understood, however, that not all advantages are necessarily discussed herein, and different embodiments may offer additional advantages, and that no particular advantage is required for all embodiments.

Among the various advantages, one advantage is that the current controller can make the overall load appear more resistive, thereby reducing the phase misalignment between the input current and the input voltage. As a result, power factor of the LED linear regulator is improved, and the efficiency of the LED linear regulator is also increased. Another advantage is that the LED current always has a non-zero value at least in part due to the current provided by the capacitor while it is discharging. Therefore, the flicker noise issues plaguing certain conventional LED linear regulators can be substantially eliminated. The embodiments disclosed herein are also easy and simple to implement and thus will not significantly impact fabrication costs.

Figure 8:
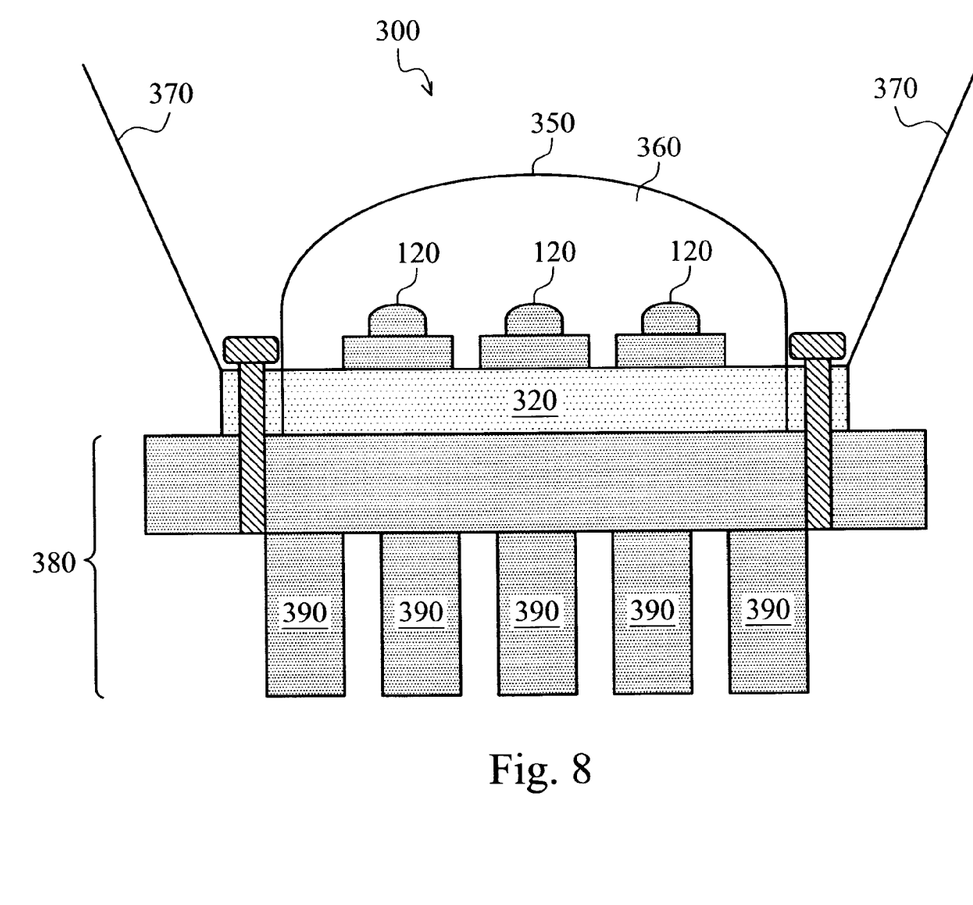
FIG. 8 is a diagrammatic fragmentary cross-sectional side view of an example LED lighting apparatus according to various aspects of the present disclosure.

The LEDs 120 may be implemented as a part of a lighting apparatus. For example, the LEDs 120 may be implemented as a part of a LED-based lighting instrument 300, a simplified cross-sectional view of which is shown in FIG. 8.

The LED dies 120 each include two doped semiconductor layers having different types of conductivity. According to various aspects of the present disclosure, these doped semiconductor layers may be the III-V compound layer 220 as discussed above, or may be formed using similar processes discussed above. The LED dies 120 also each include a multiple-quantum well (MQW) layer that is disposed in between these III-V compound layers. The MQW layer includes alternating (or periodic) layers of active material, such as gallium nitride and indium gallium nitride (InGaN). For example, the MQW layer may include a number of gallium nitride layers and a number of indium gallium nitride layers, wherein the gallium nitride layers and the indium gallium nitride layers are formed in an alternating or periodic manner. In some embodiments, the MQW layer includes ten layers of gallium nitride and ten layers of indium gallium nitride, where an indium gallium nitride layer is formed on a gallium nitride layer, and another gallium nitride layer is formed on the indium gallium nitride layer, and so on and so forth. The light emission efficiency depends on the number of layers of alternating layers and thicknesses.

When an electrical voltage (or electrical charge) is applied to the doped layers of the LED, the MQW layer emits radiation such as light. The color of the light emitted by the MQW layer corresponds to the wavelength of the radiation. The radiation may be visible, such as blue light, or invisible, such as ultraviolet (UV) light. The wavelength of the light (and hence the color of the light) may be tuned by varying the composition and structure of the materials that make up the MQW layer.

It is understood that each LED die may also include a pre-strained layer and an electron-blocking layer. The pre-strained layer may be doped and may serve to release strain and reduce a Quantum-Confined Stark Effect (QCSE)—describing the effect of an external electric field upon the light absorption spectrum of a quantum well—in the MQW layer. The electron blocking layer may include a doped aluminum gallium nitride (AlGaN) material, wherein the dopant may include Magnesium. The electron blocking layer helps confine electron-hole carrier recombination to within the MQW layer, which may improve the quantum efficiency of the MQW layer and reduce radiation in undesired bandwidths.

In some embodiments, the LED dies 120 each have a phosphor layer coated thereon. The phosphor layer may include either phosphorescent materials and/or fluorescent materials. The phosphor layer may be coated on the surfaces of the LED dies 120 in a concentrated viscous fluid medium (e.g., liquid glue). As the viscous liquid sets or cures, the phosphor material becomes a part of the LED package. In practical LED applications, the phosphor layer may be used to transform the color of the light emitted by an LED dies 120. For example, the phosphor layer can transform a blue light emitted by an LED die 120 into a different wavelength light. By changing the material composition of the phosphor layer, the desired light color emitted by the LED die 120 may be achieved.

The LED dies 120 are mounted on a substrate 320. In some embodiments, the substrate 320 includes a Metal Core Printed Circuit Board (MCPCB). The MCPCB includes a metal base that may be made of aluminum (or an alloy thereof). The MCPCB also includes a thermally conductive but electrically insulating dielectric layer disposed on the metal base. The MCPCB may also include a thin metal layer made of copper that is disposed on the dielectric layer. In alternative embodiments, the substrate 320 may include other suitable thermally conductive structures. The substrate 320 may or may not contain active circuitry and may also be used to establish interconnections.

The lighting instrument 300 includes a diffuser cap 350. The diffuser cap 350 provides a cover for the LED dies 120 therebelow. Stated differently, the LED dies 120 are encapsulated by the diffuser cap 350 and the substrate 320 collectively. In some embodiments, the diffuser cap 350 has a curved surface or profile. In some embodiments, the curved surface may substantially follow the contours of a semicircle, so that each beam of light emitted by the LED dies 120 may reach the surface of the diffuser cap 350 at a substantially right incident angle, for example, within a few degrees of 90 degrees. The curved shape of the diffuser cap 350 helps reduce Total Internal Reflection (TIR) of the light emitted by the LED dies 120.

The diffuser cap 350 may have a textured surface. For example, the textured surface may be roughened, or may contain a plurality of small patterns such as polygons or circles. Such textured surface helps scatter the light emitted by the LED dies 120 so as to make the light distribution more uniform. In some embodiments, the diffuser cap 350 is coated with a diffuser layer containing diffuser particles.

In some embodiments, a space 360 between the LED dies 120 and the diffuser cap 350 is filled by air. In other embodiments, the space 360 may be filled by an optical-grade silicone-based adhesive material, also referred to as an optical gel. Phosphor particles may be mixed within the optical gel in that embodiment so as to further diffuse light emitted by the LED dies 120.

Though the illustrated embodiment shows all of the LED dies 120 being encapsulated within a single diffuser cap 350, it is understood that a plurality of diffuser caps may be used in other embodiments. For example, each of the LED dies 120 may be encapsulated within a respective one of the plurality of diffuser caps.

The lighting instrument 300 may also optionally include a reflective structure 370. The reflective structure 370 may be mounted on the substrate 320. In some embodiments, the reflective structure is shaped like a cup, and thus it may also be referred to as a reflector cup. The reflective structure encircles or surrounds the LED dies 120 and the diffuser cap 350 in 360 degrees from a top view. From the top view, the reflective structure 370 may have a circular profile, a beehive-like hexagonal profile, or another suitable cellular profile encircling the diffuser cap 350. In some embodiments, the LED dies 120 and the diffuser cap 350 are situated near a bottom portion of the reflective structure 370. Alternatively stated, the top or upper opening of the reflective structure 370 is located above or over the LED dies 120 and the diffuser cap 350.

The reflective structure 370 is operable to reflect light that propagates out of the diffuser cap 350. In some embodiments, the inner surface of reflective structure 370 is coated with a reflective film, such as aluminum, silver, or alloys thereof. It is understood that the surface of the sidewalls of the reflective structure 370 may be textured in some embodiments, in a manner similar to the textured surface of the diffuser cap 350. Hence, the reflective structure 370 is operable to perform further scattering of the light emitted by the LED dies 120, which reduces glare of the light output of the lighting instrument 300 and makes the light output friendlier to the human eye. In some embodiments, the sidewalls of the reflective structure 370 have a sloped or tapered profile. The tapered profile of the reflective structure 370 enhances the light reflection efficiency of the reflective structure 370.

The lighting instrument 300 includes a thermal dissipation structure 380, also referred to as a heat sink 380. The heat sink 380 is thermally coupled to the LED dies 120 (which generate heat during operation) through the substrate 320. In other words, the heat sink 380 is attached to the substrate 320, or the substrate 320 is located on a surface of the heat sink 380. The heat sink 380 is configured to facilitate heat dissipation to the ambient atmosphere. The heat sink 380 contains a thermally conductive material, such as a metal material. The shape and geometries of the heat sink 380 are designed to provide a framework for a familiar light bulb while at the same time spreading or directing heat away from the LED dies 120. To enhance heat transfer, the heat sink 380 may have a plurality of fins 390 that protrude outwardly from a body of the heat sink 380. The fins 390 may have substantial surface area exposed to ambient atmosphere to facilitate heat transfer.

Figure 9:
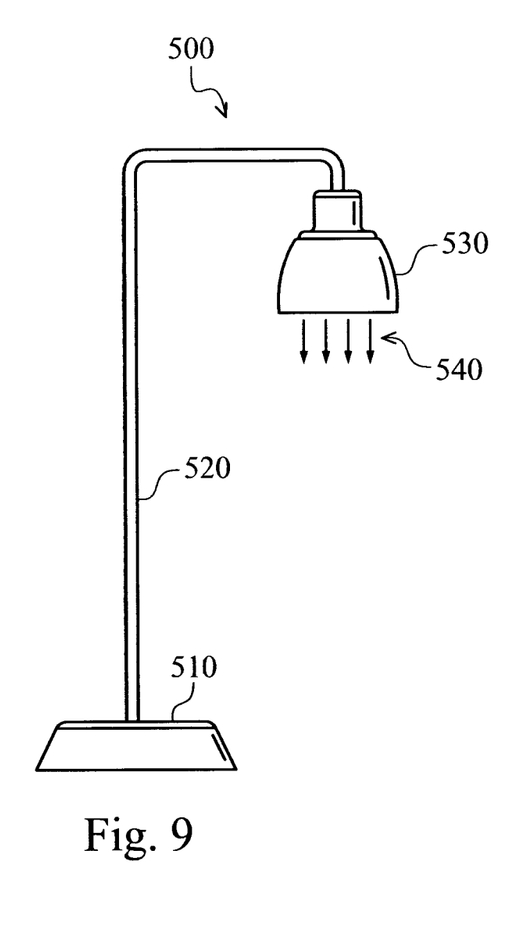
FIG. 9 is a diagrammatic view of a lighting module that includes the LED lighting apparatus of FIG. 8 according to various aspects of the present disclosure.

FIG. 9 illustrates a simplified diagrammatic view of a lighting module 500 that includes some embodiments of the lighting instrument 300 discussed above. The lighting module 500 has a base 510, a body 520 attached to the base 510, and a lamp 530 attached to the body 520. In some embodiments, the lamp 530 is a down lamp (or a down light lighting module). The lamp 530 includes the lighting instrument 300 discussed above with reference to FIG. 8. The lamp 530 is operable to efficiently project light beams 540. In addition, the lamp 530 can offer greater durability and longer lifetime compared to traditional incandescent lamps.

It is understood that other lighting applications may benefit from using the LEDs of the present disclosure discussed above. For example, the LEDs of the present disclosure may be used in lighting applications including, but not limited to, vehicle headlights or taillights, vehicle instrument panel displays, light sources of projectors, light sources of electronics such as Liquid Crystal Display (LCD) televisions or LCD monitors, tablet computers, mobile telephones, or notebook/laptop computers.

One aspect of the present disclosure involves a device. The device includes: a rectifier coupled to receive energy from an alternating current (AC) voltage source; a capacitor coupled to the rectifier; a plurality of LEDs and a current limiter coupled in series, wherein the current limiter is configured to limit a current through the LEDs, and wherein the plurality of LEDs and the current limiter are collectively coupled to the capacitor in parallel; and a current controller coupled to both the capacitor and the current limiter in series, wherein the current controller is configured to control at least a charging current of the capacitor; wherein: the device has a first current path during a first period of operation and a second current path during a second period of operation; and the capacitor charges during the first period of operation and discharges during the second period of operation.

In some embodiments, the plurality of LEDs is driven by: a current through the rectifier during the first period of operation; and a discharging current of the capacitor during the second period of operation.

In some embodiments, the device further includes: a current sensor coupled to the current controller, the current sensor being configured to sense a current level of the current controller. In some embodiments, the device further includes: a voltage sensor coupled between the rectifier and the current controller, the voltage sensor being configured to sense an output voltage of the rectifier. In some embodiments, the current controller, the current sensor, and the voltage sensor are each implemented as a discrete circuit component. In some embodiments, the current controller, the current sensor, and the voltage sensor are collectively implemented on an Integrated Circuit (IC) chip.

In some embodiments, the LEDs are coupled in matrix.

In some embodiments, the rectifier includes a bridge diode component.

In some embodiments, the current controller is further configured to increase phase alignment between an input voltage and an input current of the device.

In some embodiments, the device includes a linear power regulator. The circuitry of the power regulator may be a separately available module from the LEDs. In other embodiments, the circuitry for the power regulator and the LED may be integrated into a single device.

Another aspect of the present disclosure involves a device. The device includes: a rectifier coupled to an alternating current (AC) energy supply; an energy storage element coupled to the rectifier; a plurality of photonic devices and a current limiter coupled in series and collectively coupled to the energy storage element in parallel, the current limiter being configured to set a maximum current for the photonic devices; a current controller coupled to the energy storage element, the current controller being configured to set a maximum collective current for the energy storage element and the photonic devices; and a current sensor coupled to the current controller, the current sensor being configured to sense a current level of the current controller; wherein: the device has a first period of operation during which the energy storage element charges and a second period of operation during which the energy storage element discharges, the first and second periods being repeated in an alternating manner; the device has different electrical paths during the first and second periods of operation; the photonic devices are driven by the energy supply during the first period of operation; and the photonic devices are driven by the energy storage element during the second period of operation.

In some embodiments, the photonic devices include a plurality of light-emitting diodes (LEDs) coupled together in series and in parallel.

In some embodiments, the device further includes: a voltage sensor coupled to the rectifier, the voltage sensor being configured to sense an output voltage of the rectifier. In some embodiments, the current controller, the current sensor, and the voltage sensor are each implemented as a discrete circuit component. In some embodiments, the current controller, the current sensor, and the voltage sensor are collectively implemented as part of an Integrated Circuit (IC).

In some embodiments, the rectifier includes a bridge diode circuit.

In some embodiments, the energy storage element includes an electrolytic capacitor.

Yet another aspect of the present disclosure involves a circuit having distinctly different and alternating first and second periods of operation. The circuit includes: a bridge diode component configured to receive a current from an AC voltage source; an electrolytic capacitor coupled to the bridge diode component, wherein the capacitor is charged by the current received from the AC voltage source during the first period of operation and discharges during the second period of operation; a plurality of LEDs and a current limiter coupled in series, the LEDs and the current limiter being collectively coupled to the capacitor in parallel; a current controller coupled in series with both the capacitor and the current limiter, wherein the current controller is configured to limit at least a charging current of the capacitor during the first period of operation; and a current sensor coupled to the current controller, the current sensor being configured to sense a current level of the current controller; wherein the circuit has a first current path during the first period of operation and a second current path during the second period of operation, such that the plurality of LEDs are driven by: a current supplied by the AC voltage source during the first period of operation; and a discharging current of the capacitor during the second period of operation.

In some embodiments, the plurality of LEDs is coupled in matrix.

In some embodiments, the circuit further includes: a voltage sensor coupled between the bridge diode component and the current controller, the voltage sensor being configured to sense an output voltage of the bridge diode component. In some embodiments, the current controller, the current sensor, and the voltage sensor are collectively implemented as an Integrated Circuit (IC).

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A device, comprising:
   a rectifier coupled to receive energy from an alternating current (AC) voltage source;
   a capacitor coupled to the rectifier;
   a plurality of light-emitting diodes (LEDs) and a current limiter coupled in series, wherein the current limiter is configured to limit a current through the LEDs, and wherein the plurality of LEDs and the current limiter are collectively coupled to the capacitor in parallel; and
   a current controller coupled to both the capacitor and the current limiter in series, wherein the current controller is configured to control at least a charging current of the capacitor;
   wherein:
   the device has a first current path during a first period of operation and a second current path during a second period of operation;
   the capacitor charges during the first period of operation and discharges during the second period of operation; and
   the current controller is electrically coupled in series with the rectifier during the first period of operation.

2. The device of claim 1, wherein the plurality of LEDs is driven by:
   a current through the rectifier during the first period of operation; and
   a discharging current of the capacitor during the second period of operation.

3. The device of claim 1, further comprising: a current sensor coupled to the current controller, the current sensor being configured to sense a current level of the current controller.

4. The device of claim 3, further comprising: a voltage sensor coupled between the rectifier and the current controller, the voltage sensor being configured to sense an output voltage of the rectifier.

5. The device of claim 4, wherein the current limiter, the current controller, the current sensor, and the voltage sensor are each implemented as a discrete circuit component.

6. The device of claim 4, wherein the current limiter, the current controller, the current sensor, and the voltage sensor are collectively implemented on an Integrated Circuit (IC) chip.

7. The device of claim 1, wherein the LEDs are coupled in matrix.

8. The device of claim 1, wherein the rectifier includes a bridge diode component.

9. The device of claim 1, wherein the current controller is further configured to increase phase alignment between an input voltage and an input current of the device.

10. A device, comprising:
    a rectifier coupled to an alternating current (AC) energy supply;
    an energy storage element coupled to the rectifier;
    a plurality of photonic devices and a current limiter coupled in series and collectively coupled to the energy storage element in parallel, the current limiter being configured to set a maximum current for the photonic devices;
    a current controller coupled to the energy storage element, the current controller being configured to set a maximum collective current for the energy storage element and the photonic devices; and
    a current sensor coupled to the current controller, the current sensor being configured to sense a current level of the current controller;
    wherein:
    the device has a first period of operation during which the energy storage element charges and a second period of operation during which the energy storage element discharges, the first and second periods being repeated in an alternating manner;
    the device has different electrical paths during the first and second periods of operation;
    the current controller is electrically coupled in series with the rectifier during the first period of operation;
    the photonic devices are driven by the energy supply during the first period of operation; and
    the photonic devices are driven by the energy storage element during the second period of operation.

11. The device of claim 10, wherein the photonic devices include a plurality of light-emitting diodes (LEDs) coupled together in series and in parallel.

12. The device of claim 10, further comprising: a voltage sensor coupled to the rectifier, the voltage sensor being configured to sense an output voltage of the rectifier.

13. The device of claim 12, wherein the current controller, the current sensor, and the voltage sensor are each implemented as a discrete circuit component.

14. The device of claim 12, wherein the current controller, the current sensor, and the voltage sensor are collectively implemented as part of an Integrated Circuit (IC).

15. The device of claim 10, wherein the rectifier includes a bridge diode circuit.

16. The device of claim 10, wherein the energy storage element includes an electrolytic capacitor.

17. A circuit having distinctly different and alternating first and second periods of operation, the circuit comprising:
    a bridge diode component configured to receive a current from an AC voltage source;
    an electrolytic capacitor coupled to the bridge diode component, wherein the capacitor is charged by the current received from the AC voltage source during the first period of operation and discharges during the second period of operation;
    a plurality of LEDs and a current limiter coupled in series, the LEDs and the current limiter being collectively coupled to the capacitor in parallel;
    a current controller coupled in series with both the capacitor and the current limiter, wherein the current controller is configured to limit at least a charging current of the capacitor during the first period of operation; and
    a current sensor coupled to the current controller, the current sensor being configured to sense a current level of the current controller;
    wherein the circuit has a first current path during the first period of operation and a second current path during the second period of operation, such that the plurality of LEDs are driven by:
    a current supplied by the AC voltage source during the first period of operation; and a discharging current of the capacitor during the second period of operation; and wherein the current controller is electrically coupled in series with the bridge diode component during the first period of operation.

18. The circuit of claim 17, wherein the plurality of LEDs is coupled in matrix.

19. The circuit of claim 17, further comprising: a voltage sensor coupled between the bridge diode component and the current controller, the voltage sensor being configured to sense an output voltage of the bridge diode component.

20. The circuit of claim 19, wherein the current controller, the current sensor, and the voltage sensor are collectively implemented as an Integrated Circuit (IC).

* * * * *